(12) United States Patent
Fey

(10) Patent No.: US 12,179,430 B2
(45) Date of Patent: Dec. 31, 2024

(54) PROCESS FOR ADDITIVE MANUFACTURING AND SYSTEM

(71) Applicant: AMCM GMBH, Starnberg (DE)

(72) Inventor: Georg Fey, Munich (DE)

(73) Assignee: AMCM GMBH, Starnberg (DE)

( * ) Notice: Subject to any disclaimer, the term of this patent is extended or adjusted under 35 U.S.C. 154(b) by 379 days.

(21) Appl. No.: 17/309,303

(22) PCT Filed: Nov. 7, 2019

(86) PCT No.: PCT/EP2019/080597
§ 371 (c)(1),
(2) Date: May 17, 2021

(87) PCT Pub. No.: WO2020/104209
PCT Pub. Date: May 28, 2020

(65) Prior Publication Data
US 2022/0016839 A1 Jan. 20, 2022

(30) Foreign Application Priority Data
Nov. 19, 2018 (DE) .................. 10 2018 129 027.6

(51) Int. Cl.
*B29C 64/264* (2017.01)
*B29C 64/205* (2017.01)
(Continued)

(52) U.S. Cl.
CPC .......... *B29C 64/264* (2017.08); *B29C 64/205* (2017.08); *B29C 64/232* (2017.08);
(Continued)

(58) Field of Classification Search
CPC ... B29C 64/264; B29C 64/268; B29C 64/273; B29C 64/245; B29C 64/205;
(Continued)

(56) References Cited

U.S. PATENT DOCUMENTS 8,172,562 B2    5/2012   Mattes
9,358,729 B2    6/2016   Hofacker et al.
(Continued)

FOREIGN PATENT DOCUMENTS

CN        1678448 A     10/2005
CN      105479743 A      4/2016
(Continued)

OTHER PUBLICATIONS

"International Application Serial No. PCT/EP2019/080597, International Search Report mailed Feb. 17, 2020", w/ English Translation, (Feb. 17, 2020), 6 pgs.
(Continued)

*Primary Examiner* — Jamel M Nelson
(74) *Attorney, Agent, or Firm* — Polsinelli PC

(57) ABSTRACT

The invention relates to a method for additively manufacturing at least one three-dimensional object (1) by means of a system, wherein a coating unit (40) is stopped in a segment (A; B; C; D) and/or one of its sub-segments (A1; A2; B1; B2; C1; C2; D1; D2) as a parking segment. Furthermore, the invention relates to a system for additive manufacturing of three-dimensional objects and a computer-readable storage medium.

6 Claims, 3 Drawing Sheets

Figure 1:
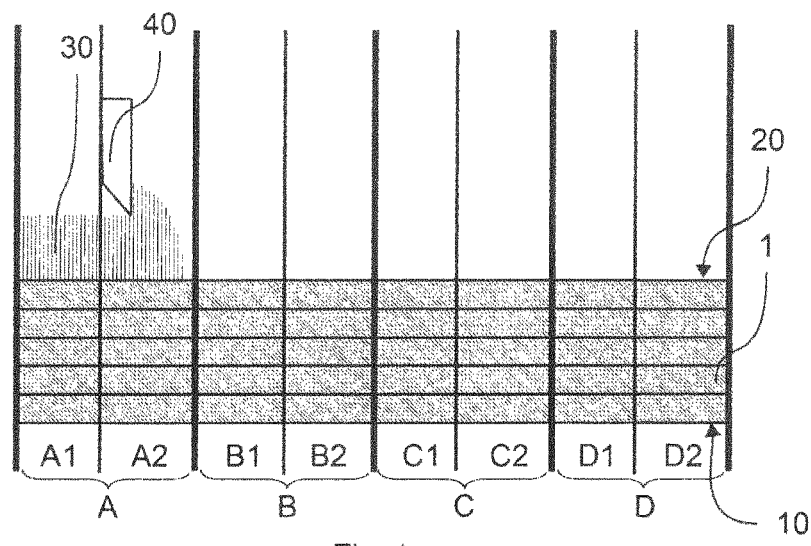

(51) Int. Cl.
    *B29C 64/232*      (2017.01)
    *B29C 64/245*      (2017.01)
    *B29C 64/386*      (2017.01)
    *B33Y 10/00*      (2015.01)
    *B33Y 30/00*      (2015.01)
    *B33Y 50/00*      (2015.01)
    *B29C 64/153*      (2017.01)

(52) U.S. Cl.
    CPC .......... *B29C 64/245* (2017.08); *B29C 64/386* (2017.08); *B33Y 10/00* (2014.12); *B33Y 30/00* (2014.12); *B33Y 50/00* (2014.12); *B29C 64/153* (2017.08)

(58) Field of Classification Search
    CPC ... B29C 64/209; B29C 64/214; B29C 64/218; B29C 64/386; B29C 64/153; B29C 64/255; B29C 64/232; B33Y 10/00; B33Y 30/00; B33Y 50/00
    See application file for complete search history.

(56) References Cited

U.S. PATENT DOCUMENTS

| | | |
|---|---|---|
| 9,573,225 B2 | 2/2017 | Buller et al. |
| 9,662,840 B1 | 5/2017 | Buller et al. |
| 9,694,541 B2 | 7/2017 | Pruett et al. |
| 9,919,360 B2 | 3/2018 | Buller et al. |
| 9,962,767 B2 | 5/2018 | Buller et al. |
| 10,144,176 B1 | 12/2018 | Buller et al. |
| 10,252,336 B2 | 4/2019 | Buller et al. |
| 10,272,525 B1 | 4/2019 | Buller et al. |
| 10,315,252 B2 | 6/2019 | Symeonidis et al. |
| 10,449,696 B2 | 10/2019 | Elgar et al. |
| 10,611,092 B2 | 4/2020 | Buller et al. |
| 10,722,944 B2 | 7/2020 | Wienberg |
| 10,786,865 B2 | 9/2020 | Hellestam |
| 10,946,446 B2 | 3/2021 | Domrose et al. |
| 11,247,390 B2 | 2/2022 | Krol et al. |
| 11,613,073 B2 | 3/2023 | Barnes |
| 11,848,534 B2 | 12/2023 | Batchelder et al. |
| 2012/0211155 A1 | 8/2012 | Wehning et al. |
| 2013/0193620 A1 | 8/2013 | Mironets et al. |
| 2016/0167160 A1 | 6/2016 | Hellestam |
| 2016/0167303 A1 | 6/2016 | Petelet |
| 2017/0259505 A1 | 9/2017 | Pruett et al. |
| 2017/0348905 A1 | 12/2017 | Fey |
| 2018/0281113 A1 | 10/2018 | Carter et al. |
| 2018/0281282 A1 | 10/2018 | Elgar et al. |
| 2018/0281283 A1 | 10/2018 | Frechman et al. |
| 2018/0281284 A1 | 10/2018 | Elgar et al. |
| 2018/0311734 A1 | 11/2018 | Herzog et al. |
| 2019/0232564 A1 | 8/2019 | Pontiller-schymura et al. |
| 2019/0315064 A1 | 10/2019 | Budge et al. |
| 2022/0001614 A1 | 1/2022 | Fey |
| 2022/0032552 A1 | 2/2022 | Fey |

FOREIGN PATENT DOCUMENTS

| Country | Number | Date | |
|---|---|---|---|
| CN | 106363768 A | 2/2017 | |
| CN | 106608044 A | 5/2017 | |
| CN | 107457988 A | 12/2017 | |
| CN | 107980022 A | 5/2018 | |
| DE | 10235434 A1 | 2/2004 | |
| DE | 102009046440 A1 | 5/2011 | |
| DE | 102010041284 A1 | 3/2012 | |
| EP | 3233336 A1 | 10/2017 | |
| EP | 3281727 A1 * | 2/2018 | .............. B22F 10/20 |
| EP | 3360659 A1 | 8/2018 | |
| WO | WO-2008074287 A1 | 6/2008 | |
| WO | WO-2020/104205 A1 | 5/2020 | |

OTHER PUBLICATIONS

"International Application Serial No. PCT/EP2019/080597, Written Opinion mailed Feb. 17, 2020", (Feb. 17, 2020), 7 pgs.
"U.S. Appl. No. 17/309,302, Restriction Requirement mailed Aug. 4, 2023", 7 pgs.
"U.S. Appl. No. 17/309,334, Non Final Office Action mailed Aug. 2, 2023", 11 pgs.
"U.S. Appl. No. 17/309,334, Response filed Jul. 14, 2023 to Restriction Requirement mailed May 17, 2023", 7 pgs.
"U.S. Appl. No. 17/309,334, Restriction Requirement mailed May 17, 2023", 8 pgs.
"Chinese Application No. 201980086717.3, Notification of the First Office Action mailed Jan. 4, 2023", (Jan. 4, 2023), 17 pgs.
"Chinese Application No. 201980087068.9, Chinese Search Report dated Dec. 14, 2022", (Dec. 14, 2022), 3 pgs.
"Chinese Application No. 201980087068.9, Office Action dated Dec. 21, 2022", (Dec. 21, 2022), 14 pgs.
"U.S. Appl. No. 17/309,302 Preliminary Amendment filed May 17, 2021", 8 pgs.
"U.S. Appl. No. 17/309,334 Preliminary Amendment filed May 19, 2021", 10 pgs.
"German Application Serial No. 102018129024.1, Search Report dated Jul. 12, 2019", (w/ Concise Statement of Relevance), 9 pgs.
"International Application Serial No. PCT/EP2019/080568, International Preliminary Report on Patentability mailed Jun. 3, 2021", 9 pgs.
"International Application Serial No. PCT/EP2019/080568, International Search Report and Written Opinion mailed Feb. 17, 2020", (w/ English Translation), 19 pgs.
"International Application Serial No. PCT/EP2019/080597, International Preliminary Report on Patentability mailed Jun. 3, 2021", 9 pgs.
"International Application Serial No. PCT/EP2019/080610, International Preliminary Report on Patentability mailed Jun. 3, 2021", 9 pgs.
"International Application Serial No. PCT/EP2019/080610, International Search Report mailed Feb. 17, 2020", (w/ English Translation), 6 pgs.
"International Application Serial No. PCT/EP2019/080610, Written Opinion mailed Feb. 17, 2020", (w/ English Translation), 13 pgs.
"Chinese Application No. 201980085828.2, Notification of the First Office Action mailed Dec. 2, 2022", (Dec. 2, 2022), 18 pgs.
"U.S. Appl. No. 17/309,302, Response filed Oct. 2, 2023 to Restriction Requirement mailed Aug. 4, 2023", 11 pgs.
"U.S. Appl. No. 17/309,334, Response filed Nov. 2, 2023 to Non Final Office Action mailed Aug. 2, 2023", 11 pgs.
"U.S. Appl. No. 17/309,334, Final Office Action mailed Nov. 29, 2023", 14 pgs.
"U.S. Appl. No. 17/309,302, Non Final Office Action mailed Dec. 27, 2023", 16 pgs.
"U.S. Appl. No. 17/309,334, Response filed Jan. 29, 2024 to Final Office Action mailed Nov. 29, 2023", 11 pages.
"U.S. Appl. No. 17/309,334, Advisory Action mailed Feb. 8, 2024", 3 pages.
"U.S. Appl. No. 17/309,302, Response filed Mar. 27, 2024 to Non Final Office Action mailed Dec. 27, 2023", 10 pages.

* cited by examiner

PROCESS FOR ADDITIVE MANUFACTURING AND SYSTEM

PRIORITY APPLICATIONS

This application is a U.S. National Stage Filing under 35 U.S.C. § 371 from International Application No. PCT/EP2019/080597, filed on Nov. 7, 2019, and published as WO2020/104209 on May 28, 2020, which claims the benefit of priority to German Application No. 10 2018 129 027.6, filed on Nov. 19, 2018; the benefit of priority of each of which is hereby claimed herein, and which applications and publication are hereby incorporated herein by reference in their entireties.

The invention relates to a method for additive manufacturing of three-dimensional objects and a system for additive manufacturing of three-dimensional objects. Furthermore, the present invention relates to a computer-readable storage medium.

Conventional processes for additive manufacturing of three-dimensional objects apply a strictly serial sequence of applying a new layer of build-up material and irradiating it to solidify the applied layer. Such a serial approach results in very large non-productive times, which reduce the overall efficiency of the system. The production of even a single three-dimensional object by means of an additive manufacturing process is correspondingly cost-intensive and time-consuming.

Furthermore, known systems for the additive manufacturing of three-dimensional objects require additional space in order to accommodate or stow away the coating unit during the irradiation for the selective solidification of the last applied build-up material outside the area to be selectively solidified, i.e. outside the installation space.

From the publications DE 10 2010 041 284 A1 and DE 10 2009 046 440 A1, methods and systems for the additive manufacturing of components are already known, which provide for a continuous movement or rotation of the coater unit.

The invention is based on the object of providing a method for additive manufacturing which enables the efficient production or generation of at least one three-dimensional object with consistent quality in a simple and cost-effective manner. Furthermore, it is an object of the invention to provide a system and a computer-readable storage medium.

According to the invention, this object is solved with respect to the method by the subject matter of claim 1, with respect to the system and with respect to the computer-readable storage medium. Specifically, the task is solved by a method for the additive manufacturing of three-dimensional objects by means of a system which has a building space, a building platform within the building space, on which the at least one object to be manufactured can be built up layer by layer, at least one coating unit for the layer-by-layer application of the build-up material in a building plane which is provided parallel to the building platform, and at least a first irradiation unit and a second irradiation unit for the locally selective solidification of the build-up material in the building plane, the method having the following steps:

subdividing the building space into at least a first and a second segment along the direction of extension of the building platform, whereby at least one of the segments is formed as a single segment or at least one of the segments is subdivided into at least two sub-segments and to each segment and/or the sub-segments of a segment at least one of the irradiation units is assigned;

applying at least one layer of the build-up material by means of the moving coating unit along the segments;

activating the associated irradiation unit in the respective segment or at least one of the sub-segments for selectively solidifying the associated segment or at least one of the associated sub-segments as soon as the coating unit has left the respective segment or sub-segment;

deactivating the respective irradiation unit as soon as an irradiation period as required is reached and the associated segment or sub-segment is selectively solidified;

stopping the coating unit in any selectively solidified segment and/or sub-segment of the subsequent segments as a parking segment, wherein the coating unit until it reaches the parking segment only passes through segments and/or sub-segments which are selectively solidified.

The invention is based on the underlying idea of providing a method that uses the coating unit and the irradiation units in such a way that optimum utilisation is achieved by minimising non-productive time. In particular, the process time for manufacturing one or more three-dimensional objects can be optimised or reduced.

For this purpose, it is provided that the coating unit takes up a parking position in an already selectively solidified segment after the application of a layer of build-up material and the start of the selective solidification. In this sense, the selective solidification in the remaining segments can be finished as quickly as possible in order to then be able to apply the next layer of build-up material. In particular, the coating unit is moved or stopped exclusively along the extension direction of the building platform, so that additional installation space for at least temporarily accommodating the coating unit can be saved.

Compared to a system with a movable building platform and a stationary coating unit, the present invention has the advantage that the coating unit has a smaller mass compared to the building platform and can thus be stopped and started in a shorter time. A comparatively more dynamic movement of the coating unit is possible. Furthermore, the mass of the building platform increases successively during the course of the manufacturing process with the application of each further layer of build material. In the case of a moving building platform, thus only a continuous movement of the building platform presents itself for additive manufacturing of a component.

In the sense of an additive manufacturing process, it is possible to build up or create a three-dimensional object or several three-dimensional objects layer by layer. Thus it is intended that the geometry of the at least one three-dimensional object is generated by depositing layers of the build-up material step by step on top of each other and solidifying them, in particular by selectively solidifying them locally.

For the purposes of the present invention, the term selective solidification means that a layer of newly applied build-up material is suitably solidified along the desired contour or contours of the at least one three-dimensional object to be produced. For this purpose, the applied layer of build-up material is specifically irradiated by the irradiation units along the geometry of the three-dimensional object to be produced. A layer of build-up material is selectively solidified in the sense of the present invention as soon as a sufficient, appropriate solidification of the layer of build-up material has taken place or has been achieved. A selectively solidified layer of build-up material thus represents a part of the end product to be produced and preferably the basis for depositing and selectively solidifying a further layer of build-up material.

According to the invention, the building space, i.e. the volume of a system for carrying out the method in the direction of extension or along the building platform, in which the at least one or more three-dimensional objects can be built up layer-by-layer, is divided into at least a first and a second segment. The layers of build-up material to be applied or deposited are to be assigned in sections to the first or second segment. The building plane set in each case can be subdivided on the basis of the segments.

Preferably, the building platform is provided as a circular or ring-shaped, oval-shaped, U-shaped, rectangular frame-shaped or similar building platform, so that one or more three-dimensional objects can be produced and arranged over an angular range of 360 degrees along a circumferentially or circularly closed building platform. In this respect, a revolution of the coating unit can be understood to mean that the coating unit is moved over at least 360 degrees along the extension of the building platform. The extension of the building platform is thus to be understood in particular as the formation of the building platform in the circumferential direction along the angular range of 360 degrees.

Furthermore, the segments can be provided as individual segments or each have sub-segments. In this way, a segment can be subdivided or subdividable into sub-segments.

One of the at least two irradiation units is assigned to each of the segments. Irradiation of sub-segments of a segment by one of the irradiation units for selective solidification can be carried out serially, i.e. one after the other.

Alternatively, sub-segments can be alternately selectively solidified by means of the associated irradiation unit of the segment in such a way that the coating unit can move through the sub-segments and the irradiation unit switches to selective solidification of the other sub-segment before the expiry of the irradiation period as required in one of the sub-segments.

Consequently, an irradiation unit can switch during selective solidification between two sub-segments as required, in particular before the required irradiation duration of one of the sub-segments has expired. If a change between the sub-segments is made by the assigned irradiation unit and the required irradiation duration has not been completely reached in one sub-segment, the selective solidification of this sub-segment is to be continued at a later time in order to achieve selective solidification.

The advantage is that by means of the sub-segments an efficient selective solidification of the applied layer of build-up material can be provided.

Deactivation of an irradiation unit is to be understood in the sense of the present invention as a switching off of the irradiation unit or as a switching of the irradiation unit between sub-segments for selective solidification, whereby the irradiation unit is switched from one sub-segment to the other sub-segment. In such a changeover of the irradiation unit from one sub-segment to another sub-segment, a complete switching off of the irradiation unit in the sense of the present invention is not necessarily required, so that the irradiation unit selectively solidifies build-up material along the sub-segments without interruption.

Furthermore, it is provided that the coating unit is moved at a constant speed in the direction of extension of the building platform or building plane during the application of a new layer of building material. Preferably, the speed at which the coating unit is moved is set in such a way that an advantageous minimisation of non-productive times during the production or manufacture of the at least one three-dimensional object is achievable.

In particular, the coating unit is advanced at least at a minimum speed, the minimum speed for advancing the coating unit corresponding to a minimum speed for depositing or applying a layer of build-up material.

Preferably, the coating unit can be moved at a maximum speed, where the maximum speed for moving the coating unit corresponds to a maximum speed for depositing or applying a layer of building material. In this way, the time required for a rotation of the coating unit along the extension of the building platform or building plane can be minimised.

A stop of the coating unit in the predeterminable parking segment is performed when a revolution period of the coating unit for applying the at least one layer of build-up material would end before the irradiation period as required in at least one of the segments along the set building plane has not yet been reached or expired. Accordingly, a parking position is assumed if the coating unit upon applying a new layer of build-up material would enter a segment that has not yet been completely selectively solidified.

In this sense, the application of a layer of build-up material is only carried out in a continuous, complete revolution along the building plane. If this is not possible due to segments or sub-segments that have not yet been selectively solidified, a parking position is assumed by the coating unit.

According to the invention, the selective solidification of the build-up material in a segment takes place when at least one layer of build-up material is deposited along the entire segment or an entire sub-segment by activating the respective associated irradiation unit.

If a segment or sub-segment is only partially coated with build-up material, there is preferably no selective solidification until the coating unit has deposited a complete layer of build-up material. The activation of the respectively assigned irradiation unit can only take place if the coating unit is not located in the respective segment or sub-segment which is to be selectively solidified. Furthermore, the respective irradiation unit for a segment or sub-segment of a segment is only activated if the last applied layer of build-up material has not already been selectively solidified.

Accordingly, deactivation of the irradiation unit in the sense of the present invention occurs when a segment or the associated sub-segments is/are selectively solidified.

Further, for the purposes of the present invention it is intended that the application of build-up material by the coating unit is deactivated after the application of at least one layer of build-up material, where the coating unit is stopped in the parking segment.

In particular, the application of build-up material by means of the coating unit can be deactivated as soon as at least one complete layer of build-up material has been deposited in all segments and/or sub-segments.

A complete layer is understood to mean that build-up material is deposited over the entire extension of a segment or sub-segment. In this sense, the coating unit makes at least one complete revolution along the building platform in order to deposit a layer of build-up material. If a segment or sub-segment has only been partially newly coated, the subsequent deposition of a further layer over the entire length of the segment or sub-segment is intended to provide a complete layer of build-up material, in particular following the other segments in the course of the last completed rotation of the coating unit.

In particular, the coating unit is repeatedly moved in the extension direction of the building platform during the entire process duration, so that a new layer of build-up material is dispensed as required. In this sense, the coating unit performs sequential revolutions along the extension of the building platform.

According to the invention, after the application of at least one layer of build-up material, the coating unit can be stopped in the parking segment for any or as needed period of time until a new layer of build-up material is or can be expediently applied.

In the sense of the invention, the coating unit exclusively passes through selectively solidified segments or uses a selectively solidified segment as a parking segment.

By means of the coating unit movable as required, including the stopping in the parking segment, and the targeted irradiation for selective solidification of at least one applied layer of build-up material, an efficient and time-saving process for the additive manufacturing of at least one three-dimensional object can be provided, in particular when the coating unit is moved at a maximum speed or maximum velocity.

By dividing the segments into sub-segments, the selective solidification can be carried out alternately in the sub-segments by means of the assigned irradiation unit.

The irradiation unit can switch between sub-segments when activated.

The irradiation units for selective solidification of the segments and/or sub-segments are selectively activated and deactivated to provide an efficient and process time reducing manufacturing of at least one three-dimensional object.

For the purposes of the invention, the process time describes in particular the time required for the complete production or manufacture of one or more three-dimensional objects distributed along the building platform.

For the purposes of the present invention, an irradiation period as required is to be understood as the period of time required for selective solidification of the last applied layer of build-up material in a segment or sub-segment. It is thus conceivable that the irradiation period required for different segments or sub-segments may differ from one another.

According to a further embodiment, a change in relative position between the building platform and the coating unit to provide a changed building plane is continuous or discontinuous.

For the purposes of the present invention, the speed of the coating unit or coating unit speed describes in particular the speed at which the coating unit moves along the extension of the building platform, in particular in the horizontal direction. The speed of the relative movement between the building platform and the coating unit describes the speed in the course of the change of the relative position between the building platform and the coating unit, in particular in the vertical direction.

The advancement of the coating unit in the direction of extension of the building platform is intended in continuous form during the application of a layer of building material. Furthermore, the relative movement, preferably at least substantially in the vertical direction, between the coating unit and the building platform can also be continuous.

Thus, a continuous, i.e. uninterrupted, readjustment of the building plane can be carried out by means of the relative movement between the building platform and the coating unit to change the relative position. Thus, the relative movement or readjustment of the building plane can be continued during the application of a layer of building material as well as during the stopping of the coating unit in the parking segment.

Alternatively, a discontinuous change of the relative position between the building platform and the coating unit, i.e. stepwise readjustment of the building plane, is possible.

According to one embodiment, the coating unit continues to move in the parking segment and depositing another layer of build-up material starts when the coating unit can complete one revolution to deposit a layer of build-up material without entering a not selectively solidified segment or sub-segment.

The coating unit, which is stopped or parked in the parking segment, can therefore be moved on, i.e. "started up" again. Accordingly, moving the coating unit further is to be understood for the purpose of the invention as starting the coating unit again from standstill.

The deposition of a new layer of build-up material by the coating unit preferably only begins when the building plane has already been readjusted, i.e. a new building plane has been set.

According to the invention, the parking segment is to be understood the segment or sub-segment in which the coating unit can be stopped as required and/or starts depositing a layer of build-up material along the newly adjusted or readjusted building plane after the change or upon the change of the relative position between the coating unit and the building platform. In the parking segment, an incomplete layer of build-up material is thus initially deposited over a section of the segment or sub-segment.

In particular, the deposition of a new layer of building material along the readjusted building plane can be started by the coating unit when the selective solidification of the previously deposited layer of building material is sufficiently advanced and completed by the time the coating unit enters the respective segment or sub-segment. In this sense, the new layer of build-up material is applied exclusively to build-up material that has already been selectively solidified.

For the purpose of the invention, the terms "when" or "as soon as" are preferably not to be understood as a concrete point in time, but rather as a determination of conditions to be fulfilled by means of which the execution of, for example, the application of a new layer of build-up material can be determined.

After the layer of build-up material has been applied, the selective solidification is started or carried out by means of the associated irradiation unit in a segment and/or sub-segment following the parking segment.

According to one embodiment, the coating unit deposits a complete layer of build-up material in the parking segment subsequent to the remaining segments or sub-segments.

Due to the deposition of an incomplete layer of build-up material along the parking segment, after the resumption or activation of the application of build-up material, no selective solidification can take place by the associated irradiation unit after leaving of the coating unit. Another complete layer of build-up material must be applied over the entire parking segment by means of the coating unit in order to be able to initiate selective solidification.

Selective solidification of the applied build-up material can be carried out by the irradiation units in the set building plane or a lowered or readjusted building plane, for example in the course of the continuous relative movement between building platform and coating unit. A deviation resulting from the lowering of the building plane, in particular a change in the angle of the irradiation or selective solidification, can be taken into account or disregarded.

In another embodiment, the duration of a revolution of the coating unit, as a time period for the coating unit to cross all segments once, is adapted such that the segment intended as a parking segment is selectively solidified within a single revolution of the coating unit for applying a layer of build-up material along all segments, such that the coating unit is stoppable in the selectively solidified parking segment.

Thus, after the application of a layer of build-up material, and optionally after the application of a complete layer along the preceding parking segment, the coating unit can enter and be stopped in the new or subsequent fully selectively solidified parking segment. The coating unit can be stopped during the ongoing manufacturing process along the extension direction of the building platform, so that no additional installation space is necessary to accommodate the coating unit as required.

In one embodiment, activating the associated irradiation unit is performed with the step of activating the associated irradiation unit in the respective segment for selectively irradiating the associated first or second sub-segment after the coating unit has left the sub-segment to be selectively solidified. The coating unit may use the first sub-segment as a parking segment while the second sub-segment is selectively solidified, or may use the second sub-segment as a parking segment while the first sub-segment is selectively solidified.

On the basis of the sub-segments, an advantageous subdivision of the segments can be made, whereby the sub-segments are solidifiable serially or alternately in order to minimise non-productive times during the production or manufacture of at least one three-dimensional object.

In an ancillary aspect of the invention, there is provided a system suitable for additive manufacturing of three-dimensional objects by layer-by-layer deposition of a build-up material and locally selective solidification of the build-up material according to the method of the present invention.

The system according to the invention is formed with the building space, the building platform within the building space, on which the at least one object to be manufactured can be built up layer by layer, the at least one coating unit for layer-by-layer application of the build-up material in a building plane which is provided parallel to the building platform, and at least the first irradiation unit and the second irradiation unit for locally selective solidification of the build-up material in the building plane. The building space is subdivided in the direction of extension of the building platform at least into the first segment and the second segment and at least one of the segments is formed as a single segment or at least one of the segments is subdivided into at least two sub-segments. At least one of the irradiation units is assigned to each segment or the sub-segments of a segment, wherein the coating unit is successively movable through the first segment and the second segment for applying a layer of build-up material. The segments or sub-segments are each selectively solidifiable by means of the associated irradiation unit as soon as the coating unit has applied a complete layer of build-up material in the respective segment or sub-segment and the coating unit has left the respective segment or sub-segment. The coating unit is stoppable in any selectively solidified segment and/or sub-segment of the subsequent segments as a parking segment, whereby the coating unit until the parking segment is reached can only pass through segments and/or sub-segments that are selectively solidified.

The at least one coating unit serves to apply the build-up material layer by layer in a building plane which is provided parallel to the building platform. The building platform thus represents the basic plane of the system on which the at least one three-dimensional object can be produced. When depositing the first layer of build-up material for an object to be manufactured, the building plane is thus preferably arranged on the building platform.

Alternatively, the first building plane for applying the first layer of build-up material can be vertically offset relative to the building platform in such a way that a powder bed or not selectively solidified material bed remains below the finally selectively solidified layer of build-up material. This makes it easier to detach the finished three-dimensional object from the building platform.

The coating unit can be arranged inclined with respect to the vertical or horizontal in such a way that an expedient application of build-up material along the intended, adjusted construction plane is possible. In particular, the coating unit can be arranged inclined in such a way that gravity effects can be compensated for when depositing or applying the build-up material.

For the purposes of the present invention, the building plane describes in particular the current working plane in which a new, further layer of build-up material is to be applied or selectively solidified. The readjustment of the building plane or a readjusted building plane thus describes the change of the building plane in order to be able to apply and selectively solidify a new, next layer of build-up material, in the sense of a layer-by-layer production or creation of at least one three-dimensional object.

Such a readjustment of the building plane can be done by changing the relative position between the coating unit and the building platform, in particular by moving the building platform or the coating unit in vertical direction.

According to one embodiment, the at least two segments and/or their sub-segments form a closed path, in particular a circular path, along the construction plane, in particular so that the coating unit can cross directly, or indirectly via at least one further segment or its sub-segments, from the first segment into the second segment and from the second segment into the first segment.

The segments or sub-segments are provided in such a way that a continuous, uninterrupted surface is available by means of the irradiation units and the coating unit for the production or manufacture of at least one three-dimensional object. The crossing between, in particular, adjacently arranged segments or sub-segments can thus take place directly.

For example, when three segments are formed, direct crossings can occur between the first and second segments, the second and third segments, and the third and first segments. An indirect crossing would be possible, for example, between the first and third segments, with the second segment in between.

As the building platform is preferably ring-shaped, by means of the irradiation units and the coating unit several or a single three-dimensional object can be produced or manufactured circularly or over an angular range of 360 degrees.

In one embodiment, the individual segments and/or their sub-segments along the building platform are formed with identical size and/or have a comparable irradiation period for selective solidification of the applied layer of build-up material along the building plane, so that a total irradiation period for selective solidification of at least one layer or more layers of the applied build-up material along all segments and/or sub-segments in the building plane can be minimised or is minimised.

In particular, the minimisation of the respective total irradiation period for the selective solidification of one, several or all layers of the applied build-up material for the at least one three-dimensional object to be produced can be carried out along the segments or sub-segments.

In particular, the segments or sub-segments are distributed along the length of the building platform in such a way that an optimal, i.e. preferably minimal, total irradiation period can be achieved for the individual layer or several layers of build-up material.

For the purposes of the present invention, the total irradiation period is to be understood as the time period for selective solidification of the deposited layer of build-up material in all segments or sub-segments. Thus, the total irradiation period begins with the start of the selective solidification in the first fully coated segment and ends with the selective solidification or the end of the selective solidification in the last selectively solidified segment of the same layer of build-up material.

By reducing non-productive times in addition to the total irradiation period of the plurality of layers, the process time for producing or manufacturing the at least one three-dimensional object can be reduced. At most short interruptions of the selective solidification are necessary to apply new build-up material. For example, extensive traverse path distances of the coating unit to areas beside the building plane or the building platform in order to park or accommodate the coating unit during the selective solidification can be saved.

According to a further embodiment, the system is adapted to provide a relative movement for changing the vertical relative position between the building platform and the coating unit within the building space continuously or discontinuously.

The adjustment or readjustment of the building plane can be carried out or started during the application or after the completion of the application of a previous or preceding layer of build-up material, in particular a complete layer of build-up material along all segments or sub-segments. Thus, the adjustment or readjustment of the building plane can also already be carried out when at least one of the segments or sub-segments has not yet been selectively solidified.

In both the discontinuous and the continuous readjustment of the building plane by a relative movement between the building platform and the coating unit, deviations during the selective solidification of build-up material can be disregarded or compensated for by an adaptation of the irradiation units, in particular by a change of angle.

In the sense of a movement of the coating unit, the coating unit can move in the direction of extension of the building platform during the readjustment of the building plane, i.e. during the vertical relative movement between the coating unit and the building platform. During the application of build-up material along a building plane, the readjustment for the subsequent building plane can already take place or be started. In particular, the relative movement or adjustment of the building plane can also be started or continued while the coating unit is stopped in the parking segment.

In one embodiment, the coating unit is can be moved on in the parking segment and the deposition of a further layer of build-up material is providable when the coating unit can complete one revolution to apply a layer of build-up material without entering a not selectively solidified segment or sub-segment.

Depending on the progress of the selective solidification of the last applied layer of build-up material, a new layer of build-up material can be applied at the next possible time. In this way, an efficient production or manufacturing of at least one three-dimensional object can be provided, in that the non-productive times, and thus the process duration as a whole, can be minimised or is minimised.

According to a preferred embodiment, the coating unit can be moved successively through the first sub-segment and the second sub-segment, wherein the first and second sub-segments of the respective segment can be selectively solidified successively or alternately by means of the associated irradiation unit. The first sub-segment can be provided as a parking segment, while the second sub-segment can be selectively solidified, or the second sub-segment can be provided as a parking segment, while the first sub-segment can be selectively solidified.

Thus, a segment can be made usable on the basis of the subdivision into partial segments as required or section by section, in particular so that non-productive times during the manufacturing of at least one three-dimensional object can be reduced.

According to a further embodiment, the system comprises a control unit which is preferably at least adapted to control the movement and/or the duration of a revolution of the coating unit as well as the application of build-up material by the coating unit, the activation and deactivation of at least one of the irradiation units, preferably several irradiation units, more preferably all irradiation units, and/or the execution of the vertical relative movement between the building platform and the coating unit within the building space.

The control unit of the system according to the invention is preferably provided for controlling and/or regulating the system in the sense of the method according to the invention, at least as required. In this respect, the control unit is in particular designed to execute or carry out a method according to the invention with the system.

An efficient and process time-optimised additive manufacturing of at least one three-dimensional object can be provided.

According to another ancillary aspect of the invention, there is provided a computer-readable storage medium containing instructions for causing at least one processor, in particular a processor of the control unit of a system according to the invention, to implement a method according to the invention when the instructions are executed by the at least one processor.

The invention is explained in more detail below with reference to the attached schematic drawings, using examples of embodiments.

Figure 4:
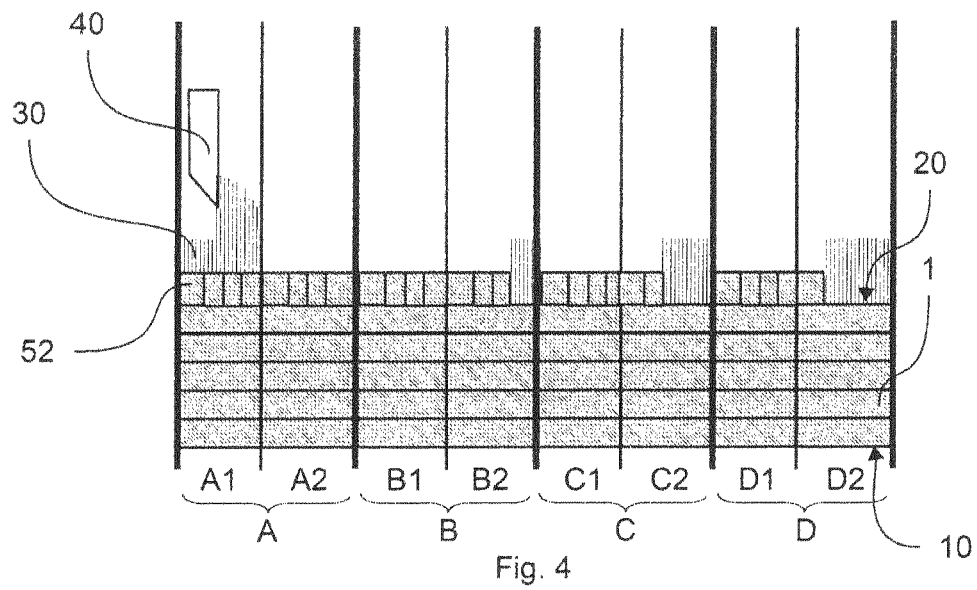
Figure 5:
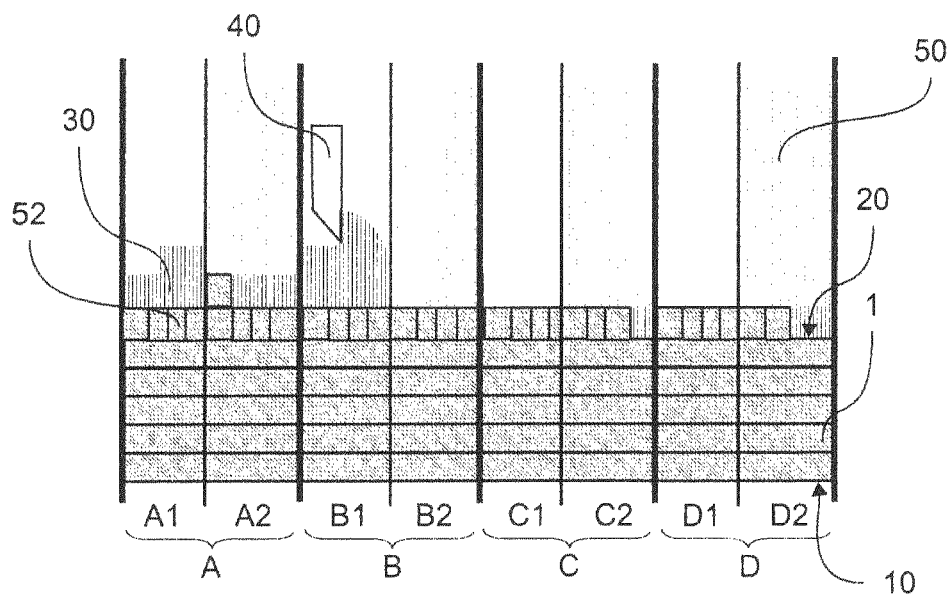
Figure 6:
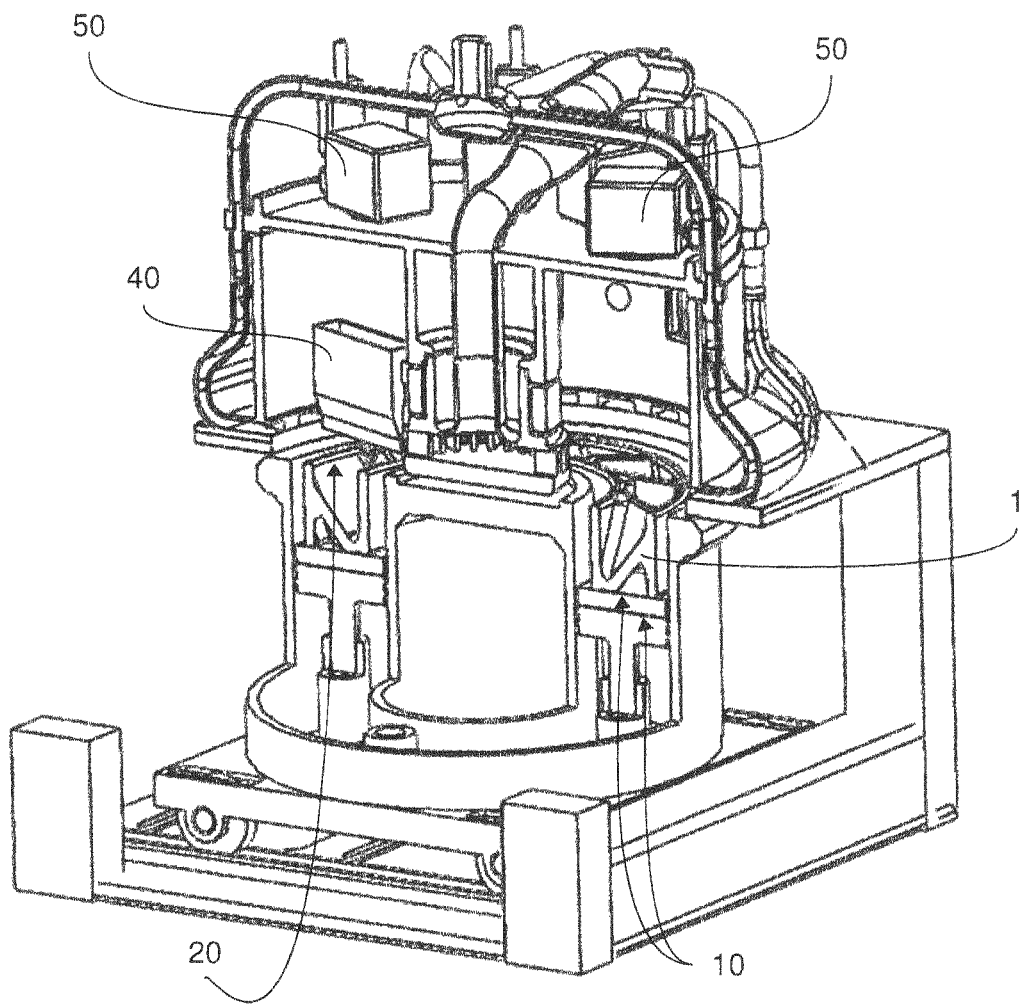

In these show:

FIGS. 1-5 schematic representations of various states during an exemplary sequence of the method according to the invention by means of a system according to the invention; and FIG. 6 an embodiment of a system according to the invention for additive manufacturing of at least one three-dimensional object in a perspective sectional view.

FIG. 1 shows a schematic cross-sectional view of a building platform 10, which is divided into a total of four segments A; B; C; D. According to FIG. 1, there are five selectively solidified layers on the building platform for forming at least one three-dimensional object 1.

The building plane 20 provided according to FIG. 1 is set on the uppermost, selectively solidified layer of build-up material 30 of the object 1 to be manufactured. A coating unit 40 according to FIG. 1 deposits a layer of build-up material 30 along the building plane 20 over the extension of the first segment A.

For the purposes of FIGS. 1-5, a movement of the coating unit 40 is to be understood as a movement from left to right through the segments A to D along the building platform 10.

Preferably, the segments A; B; C; D have comparable, in particular identical, irradiation periods as required for selective solidification of applied build-up material 30.

A preferably annular design of the building platform 10 is illustrated in FIGS. 1 to 5 by the fact that the coating unit passes directly from the fourth segment D into the first segment A in order to perform a circular movement or revolution.

In FIG. 1, it is further shown that the segments A; B; C; D are each further divided into two sub-segments A1; A2; B1; B2; C1; C2; D1; D2. The coating unit 40 may apply a layer of build-up material 30 along the sub-segments A1; A2; B1; B2; C1; C2; D1; D2 to deposit a complete layer of build-up material 30.

In this sense, the sub-segments A1-D2 of the segments A-D can have comparable, in particular identical, irradiation periods as required for selective solidification of applied build-up material 30.

Figure 2:
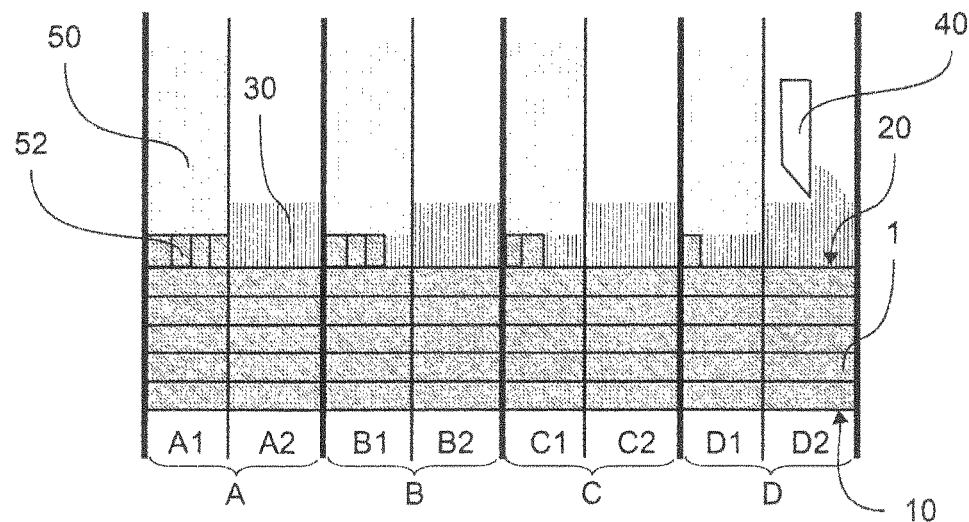

In FIG. 2, in the first sub-segment A1; B1; C1; D1 of segments A; B; C; D, the selective solidification of the build-up material 30 has been initiated by means of the respectively associated irradiation unit 50, in particular in each case immediately after the coating unit 40 has been moved out of the respective sub-segment A1; B1; C1; D1.

In particular, the sub-segments A1; A2; B1; B2; C1; C2; D1; D2 of a respective segment A; B; C; D are associated with a common irradiation unit 50 which can selectively solidify the sub-segments A1; A2; B1; B2; C1; C2; D1; D2 of a segment A; B; C; D serially or alternately. Thus, in FIG. 2 it is shown that after the application of a complete layer of build-up material 30, the first sub-segment A1; B1; C1; D1 of each of the segments A; B; C; D is selectively solidified.

Respective progress indicators 52 indicate the progress of the selective solidification. Thus, it is shown that, according to FIG. 2, the selective solidification of the first sub-segment A1 of the first segment A is completed until the coating unit 40 re-enters. Subsequently, the second sub-segment A2 of the first segment A is selectively solidified by means of the associated irradiation unit 40.

After the first sub-segments A1; B1; C1; D1 are selectively solidified, the individual irradiation units 50 may each proceed to selectively solidify the second sub-segment A2; B2; C2; D2.

Figure 3:
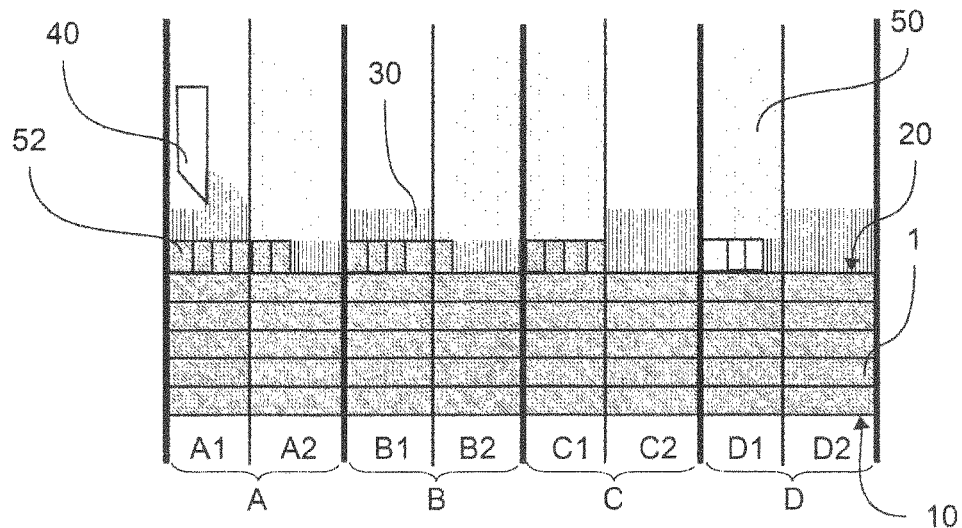

Thus, the coating unit 40 can move into the selectively solidified first sub-segment A1 of the first segment A, which represents the parking segment according to FIG. 3.

In FIG. 3, the irradiation period as required of the first sub-segment A1 of the first segment A has expired and the last applied build-up material 30 is thus selectively solidified. Subsequently to the first sub-segment A1, the second sub-segment A2 of the first segment A in FIG. 3 is selectively solidified with the same, assigned irradiation unit 50 until the expiry of the respective irradiation period as required. The same applies to the first and second sub-segments B1; B2 of the second segment B. In this sense, there is a serial selective solidification of the sub-segments A1-D2 of the respective segments A-D.

Furthermore, in FIG. 4, during an interruption of the selective solidification in all sub-segments A1-D2, the building plane 20 is readjusted by changing the vertical relative position between coating unit 40 and building platform 10, in particular by spacing them further apart in the vertical direction. Thus, according to FIG. 4, the application of a further layer of build-up material 30 in the first sub-segment A1 of the first segment A can already be started, even if the selective solidification of the previously deposited layer of build-up material 30, according to the respective progress indicators 52, is not yet completely finished in the remaining segments B-D.

If selective solidification of the complete layer of build-up material in the subsequent segments B; C; D has not yet progressed to such an extent that readjustment of the building plane and/or deposition of a new layer of build-up material 30 can take place, the coating unit 40, on the other hand, remains in the parking position in the parking segment.

It can be seen from FIG. 5 that the first segment A or its first sub-segment A1 is only partially covered with build-up material 30 in the subsequent building plane 20. The coating unit 40 moves into the second sub-segment B2 of the second segment B for the application of a further layer of build-up material 30 with the expiry of the irradiation period as required. By means of this timing of selective solidification and application of a new layer of build-up material 30, the non-productive times of the manufacturing process or of the production process for the at least one three-dimensional object 1 are reduced.

Furthermore, it is shown in FIG. 5 that in the first, second, third and fourth segments A; B; C; D, the selective solidification by the associated irradiation unit 50 has been started or continued, respectively, for complete selective solidification until the coating unit 40 reenters the respective segment A-D or the sub-segments B2-D2; A2, respectively.

In contrast, no selective solidification is carried out in the only partially coated first sub-segment A1 of the first segment A as a parking segment until the coating unit 40 has deposited a complete layer of build-up material 30 over the entire extension of the first sub-segment A1 of the first segment A in the following cycle. Rather, in this case, the fully coated second sub-segment A2 of the first segment A is selectively solidified first.

In this sense, the parking segment may travel across each of the segments A; B; C; D or sub-segments A1-D2, in the course of changing the relative position between the coating unit 40 and the building platform 10 to provide a subsequent building plane 20.

In FIG. 6, an exemplary embodiment of a system according to the invention for additive manufacturing of at least one three-dimensional object 1 is shown in a perspective cross-section.

The system has the building platform 10, above which a building space is formed for the layer-by-layer construction of at least one three-dimensional object 1. In particular, one three-dimensional object 1 or several three-dimensional objects 1 can be built up layer by layer distributed along the annular or circular extension of the building platform 10.

The coating unit 40 is arranged above and vertically spaced from the building platform 10 and can apply or deposit build-up material 30 along the respective set building plane 20 in the sense of a layered build.

Irradiation units 50 are arranged above and vertically spaced from the coating unit 40 and distributed over the extension of the annular building platform 10. In particular, the irradiation units 50 are assigned and arranged respectively to the segments A; B; C; D for selective solidification.

In summary, the targeted use of the irradiation units 50 and the coating unit 40, which can be stopped in a parking segment as required, enables time-optimised manufacture of at least one three-dimensional object 1. By means of the parking segment, an additional installation space as well as traverse paths for temporarily accommodating the coating unit 40 outside the installation space can be saved. By moving the coating unit 40 at preferably maximum speed, the time periods in which the irradiation units 50 cannot perform selective solidification can also be shortened, thus reducing the overall manufacturing time or process duration.

In this sense, the parallel deposition of build-up material 30 and the selective solidification along sections or segments A-D and/or sub-segments A1; A2; B1; B2; C1; C2; D1; D2 in the set building plane 20 make it possible to reduce the non-productive times for additive manufacturing, to optimise the efficiency of the system utilisation in the production of three-dimensional objects 1, in particular also of a single large, three-dimensional object 1, and to ensure a sufficient quality of the resulting three-dimensional object 1.

LIST OF REFERENCE SIGNS 1 object to be manufactured/processed layers of build-up material
10 building platform
20 building plane
30 layer of build-up material to be applied
40 coating unit
50 activated irradiation unit
52 progress indicators
A; B; C; D segments
A1; A2 sub-segments of the first segment
B1; B2 sub-segments of the second segment
C1; C2 sub-segments of the third segment
D1; D2 sub-segments of the fourth segment

The invention claimed is:

1. A method for the additive manufacturing of an object by means of a system which has a building space, a building platform within the building space, on which the object to be manufactured can be built up layer by layer, at least one coating unit for a layer-by-layer application of a build-up material in a building plane, which is provided parallel to the building platform, and at least two irradiation units including a first irradiation unit and a second irradiation unit, the at least two irradiation units for locally selective solidification of the build-up material in the building plane, wherein the method comprises:
    subdividing the building space into at least a first and a second segment along a direction of extension of the construction building platform, where at least one of the segments is formed as a single segment or at least one of the segments is subdivided into at least two sub-segments and to each segment and/or the sub-segments of a segment, at least one irradiation unit of the at least two irradiation units is assigned;
    applying at least one layer of the build-up material by means of the at least one coating unit moving along the segments;
    activating the at least one irradiation unit associated with the respective segment or at least one of the sub-segments for selectively solidifying the segment or at least one of the associated sub-segments as soon as the at least one coating unit has left the respective segment or sub-segment;
    deactivating the at least one irradiation unit as soon as an irradiation period is reached and the segment or sub-segment is solidified; and
    stopping of the at least one coating unit in any selectively solidified segment or sub-segment of the subsequent segments as a parking segment,
    wherein the at least one coating unit until it reaches the parking segment only passes through segments and/or sub-segments which are selectively solidified.

2. The method according to claim 1, wherein a change in a relative position between the building platform and the at least one coating unit to provide a changed building plane is continuous or discontinuous.

3. The method according to claim 1, wherein the at least one coating unit is moved in the parking segment and deposition of another layer of build-up material is started when the at least one coating unit is able to complete one revolution to deposit a layer of build-up material without entering a not selectively solidified segment or sub-segment.

4. The method according to claim 3, wherein the at least one coating unit subsequently to the remaining segments or sub-segments deposits a complete layer of build-up material in the parking segment.

5. The method according to claim 1, wherein a duration of one revolution of the at least one coating unit, as a period of time for the at least one the coating unit to cross all segments once, is adapted such that the segment, which is intended as the parking segment, is selectively solidified within a single revolution of the at least one coating unit for applying a layer of build-up material along all segments, so that the at least one coating unit is stoppable in the selectively solidified parking segment.

6. The method according to claim 1, wherein the activating the at least one irradiation unit includes:
    activating the at least one irradiation unit in the respective segment for selectively irradiating the associated first or second sub-segment after the at least one coating unit has left the sub-segment to be selectively solidified,
    wherein the first sub-segment can be used as the parking segment while the second sub-segment is selectively solidified, or the second sub-segment can be used as the parking segment while the first sub-segment is selectively solidified.

* * * * *